United States Patent
Kasai et al.

(10) Patent No.: US 8,794,073 B2
(45) Date of Patent: Aug. 5, 2014

(54) STRUCTURE FOR ATTACHING VIBRATION SENSOR TO STORAGE DEVICE

(75) Inventors: Shigeru Kasai, Tokyo (JP); Yasuhiro Sasaki, Tokyo (JP); Hiroshi Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 350 days.

(21) Appl. No.: 13/390,606

(22) PCT Filed: Aug. 9, 2010

(86) PCT No.: PCT/JP2010/063468
§ 371 (c)(1),
(2), (4) Date: Feb. 15, 2012

(87) PCT Pub. No.: WO2011/024631
PCT Pub. Date: Mar. 3, 2011

(65) Prior Publication Data
US 2012/0137780 A1    Jun. 7, 2012

(30) Foreign Application Priority Data
Aug. 25, 2009  (JP) ................................ 2009-194587

(51) Int. Cl.
*G01H 11/08* (2006.01)
(52) U.S. Cl.
USPC ............................................. 73/660; 73/493
(58) Field of Classification Search
USPC ........................................ 73/493, 660; 360/75
See application file for complete search history.

(56) References Cited

U.S. PATENT DOCUMENTS

| | | | | |
|---|---|---|---|---|
| 5,452,612 A | * | 9/1995 | Smith et al. | ............... 73/514.34 |
| 7,861,593 B2 | * | 1/2011 | Bougaev et al. | ............... 73/660 |
| 2005/0235105 A1 | | 10/2005 | Yoshida | |

FOREIGN PATENT DOCUMENTS

| | | |
|---|---|---|
| JP | 10-199120 | 7/1998 |
| JP | 2003-228956 | 8/2003 |
| JP | 2005-301862 | 10/2005 |
| WO | WO 2005/052601 | 6/2005 |

OTHER PUBLICATIONS

International Search Report, PCT/JP2010/063468, Nov. 2, 2010.

* cited by examiner

*Primary Examiner* — John Chapman, Jr.
(74) *Attorney, Agent, or Firm* — Young & Thompson

(57) ABSTRACT

A structure for attaching a vibration sensor to a storage device having a recording or reproducing head that records on or reproduces from a recording medium, includes: a first vibration sensor which is provided on a first outer surface of a base of the storage device, and detects vibration in a direction perpendicular to a surface of the recording medium; a second vibration sensor which is provided on a second outer surface of the base, the second surface orthogonal to the first outer surface, and detects vibration in an in-plane direction of the recording medium; an urging section which has a first end portion in contact with an upper surface of the first vibration sensor and a second end portion in contact with an upper surface of the second vibration sensor, and has a substantially L-shape; and a damping member affixed to the urging section.

15 Claims, 5 Drawing Sheets

|  | CONDITION 1 | CONDITION 2 | CONDITION 3 | CONDITION 4 | CONDITION 5 |
|---|---|---|---|---|---|
| PRESSING FORCE | 0 | 0.005N | 0.01N | 0.3N | 0.5N |
| RELATIVE ACCELERATION | × | × | ○ | ○ | × |

STRUCTURE FOR ATTACHING VIBRATION SENSOR TO STORAGE DEVICE

TECHNICAL FIELD

The present invention relates to a structure for attaching a vibration sensor to a storage device, which detects mechanical vibration of the storage device and vibration and impact applied to the storage device from outside. More specifically, the present invention relates to a structure for attaching a vibration sensor to a storage device, which can realize high detection performance and high detection accuracy of the vibration sensor.

BACKGROUND ART

Recent developments in Internet technology contribute to the popularization of digital information technology of precision electronic devices such as computers, and user friendliness is being improved.

On electronic devices such as personal computers there are mounted various devices using mechanical mechanisms, which include a storage device such as a hard disk drive (HDD) or a magneto-optical memory, a cooling fan, and a piezoelectric backlight power supply. For example, a storage device for a personal computer includes a magnetic recording medium, a magnetic head, a slider, a head arm, a voice coil motor, and the like.

Such storage devices have high densities and large capacities. Since the storage device handles valuable information data such as image or video data, or analysis data, high reliability is required. However, such storage devices include many mechanism elements and mechanical parts, and are prone to failure due to disturbances such as impact and vibration.

Moreover, while used for a long time, these mechanism elements and mechanical parts of the storage device may generate abnormal vibration associated with deterioration or the like due to the long-term use.

Therefore, a sensor for detecting disturbances received by the storage device, or vibration generated by the storage device itself, more specifically, a vibration sensor for detecting acceleration, speed, and displacement is mounted on the storage device.

Detection performance of the vibration sensor differs depending on in which direction is the storage device vibration to be detected. Moreover, detection accuracy differs depending on the attachment position or the attachment method of the vibration sensor, in addition to the performance of the vibration sensor itself.

An abnormality in the storage device is reflected in the behavior of the recording medium or the head arm. Therefore, it is desired that the attachment position of the vibration sensor is mainly in an in-plane direction of the recording medium and in a direction perpendicular to the surface thereof. Thus, by detecting vibrations in two directions of the recording medium, detection performance for abnormalities in the storage device is improved.

As a conventional method for detecting vibrations in two different directions, an acceleration detection device capable of independently detecting acceleration in two directions orthogonal to each other by using two acceleration sensors has been proposed (refer to Patent Document 1).

FIG. 10 is a perspective view showing the acceleration detection device. This acceleration detection device 101 includes an acceleration sensor 103 and an acceleration sensor 104. The acceleration sensor 103 and the acceleration sensor 104 are attached on a sensor attachment plane 102, inverted by 180 degrees to each other in the sensor attachment plane 102.

A maximum-sensitivity axial direction $P_A$ of the acceleration sensor 103 with respect to the sensor attachment plane 102 and a maximum-sensitivity axial direction $P_B$ of the acceleration sensor 104 with respect to the sensor attachment plane 102 are inclined with respect to the sensor attachment plane 102 by an angle θ.

The acceleration detection device 101 is provided with an arithmetic section that calculates a sum (SA+SB) of an output SA and an output SB of the two acceleration sensors 103 and 104, and an arithmetic section that calculates a difference (SA−SB) between the respective outputs SA and SB. The acceleration detection device 101 detects acceleration in a direction perpendicular to the sensor attachment plane 102 from the sum (SA+SB), and acceleration in a direction parallel to the sensor attachment plane 102 from the difference (SA−SB), respectively independently.

As a result, acceleration in two directions orthogonal to each other can be detected independently. Moreover, because the identical two acceleration sensors are used, manufacturing cost of the acceleration sensor can be reduced, and further, thinning of the product can be realized.

Conventionally, an attachment position of the vibration sensor has been any position of a control circuit board of a storage device, inside the storage device, and an exterior part of the storage device. Because the acceleration sensor described above is a surface-mounted chip part, it is attached to the control circuit board of a storage device or inside the storage device by a solder joint.

Moreover, a storage device that reduces noise by suppressing vibration by a vibration sensor has been proposed (refer to page 7 in Patent Document 2).

This storage device has a configuration in which a vibration sensor is fixed to a surface of a top cover of the storage device by an adhesive. The storage device suppresses vibration transmitted from a head assembly to the top cover to realize low noise, by feeding back an output of the vibration sensor to an actuator attached to the top cover.

PRIOR ART DOCUMENT

Patent Documents

[Patent Document 1] Pamphlet of PCT International Publication No. WO 2005/052601
[Patent Document 2] Japanese Unexamined Patent Application, First Publication No. 2003-228956

SUMMARY OF THE INVENTION

Problem to be Solved by the Invention

However, there are some problems in the acceleration detection apparatus disclosed in Patent Document 1.

A first point at issue is that detection performance is low because the acceleration sensor cannot be provided at positions for maximum vibration both in the in-plane direction of the storage device and in the direction perpendicular to the surface thereof.

The reason is that because the acceleration sensor is a surface-mounted chip, the attachment position is limited to the control circuit board of the storage device or inside the storage device. As a result, detection performance in any one direction of the in-plane direction and the direction perpendicular to the surface is high, however, detection performance in any other direction decreases.

Moreover, in the case where the acceleration sensor is built in the storage device, at the time of replacement of the acceleration sensor, the storage device needs to be opened. Consequently, maintenance is not easy.

A second point at issue is that if the vibration sensor is fixed by an adhesive, the output value of the vibration sensor changes, and as a result, detection accuracy decreases. This is caused by a change in a contact state between the storage device and the vibration sensor.

For example, at the time of operating the storage device, the temperature inside the storage device and the temperature of the exterior increase. As a result, the adhesion strength at the time of fixing the vibration sensor by an adhesive becomes unstable.

The present invention has been conceived in view of the above situation, and has an object thereof to provide a structure for attaching a vibration sensor to a storage device, which can realize high detection performance and high detection accuracy, when mechanical vibration of the storage device and vibration and impact applied to the storage device from outside are detected by the vibration sensor.

Means for Solving the Problem

A structure of the present invention for attaching a vibration sensor to a storage device having a recording or reproducing head that records on or reproduces from a recording medium, includes: a first vibration sensor which is provided on a first outer surface of a base of the storage device, and detects vibration in a direction perpendicular to a surface of the recording medium; a second vibration sensor which is provided on a second outer surface of the base, the second surface orthogonal to the first outer surface, and detects vibration in an in-plane direction of the recording medium; an urging section which has a first end portion in contact with an upper surface of the first vibration sensor and a second end portion in contact with an upper surface of the second vibration sensor, and has a substantially L-shape; and a damping member which is affixed to the urging section.

The urging section may be fixed to either one or both of the first outer surface and the second outer surface by fastening, welding, or bonding.

The urging section may have two or more bent portions.

A protective portion integrated with the urging section may be provided at the second end portion of the urging section.

A pressing force applied to the first vibration sensor and the second vibration sensor by the urging section is preferably from 0.01 N to 0.03 N inclusive.

Effect of the Invention

According to the present invention, the vibration sensor can be attached to the position for maximum vibration in a direction perpendicular to the surface of the recording medium and the position for maximum vibration in the in-plane direction thereof. Consequently, detection performance both in the in-plane direction and the direction perpendicular to the surface can be increased. As a result, detection performance of vibration and impact can be improved.

Moreover, because the attachment strength of the vibration sensors in the storage device becomes constant, output values of these vibration sensors do not vary. As a result, detection accuracy can be improved.

EMBODIMENTS FOR CARRYING OUT THE INVENTION

Embodiments for implementing a structure for attaching a vibration sensor to a storage device of the present invention will be explained below.

The embodiments are for specifically explaining the gist of the invention for better understanding, and does not limit the present invention, unless particularly specified.

First Exemplary Embodiment

Figure 1:
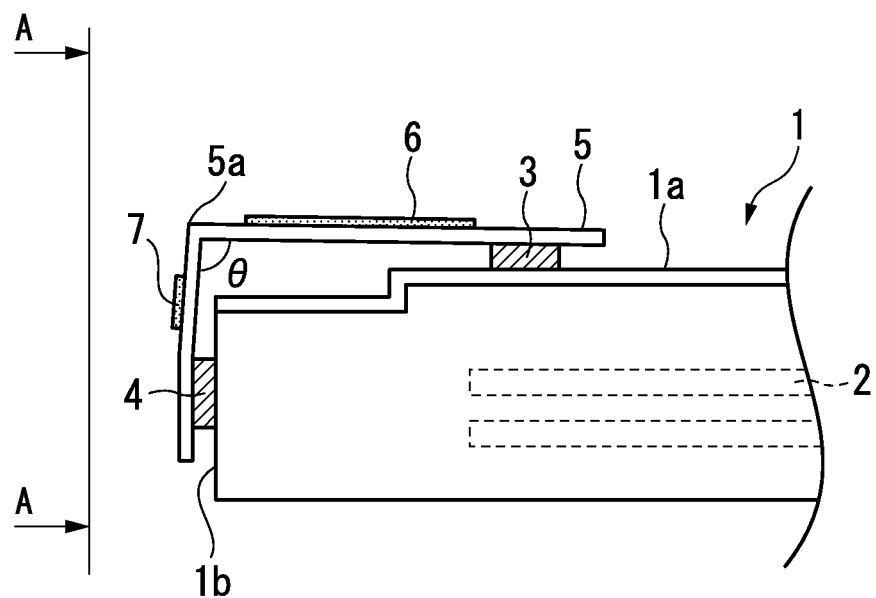
FIG. 1 is a sectional view showing a structure for attaching a vibration sensor to a storage device, according to a first exemplary embodiment of the present invention.
Figure 2:
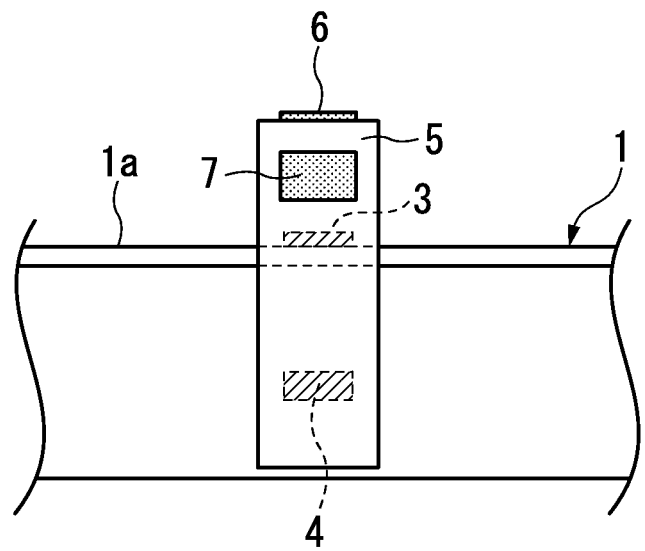
FIG. 2 is a side view as seen from line A-A side in FIG. 1.

FIG. 1 is a sectional view showing a structure for attaching a vibration sensor to a storage device, according to a first exemplary embodiment of the present invention. FIG. 2 is a side view as seen from line A-A side in FIG. 1.

As shown in FIG. 1, a storage device 1 includes a recording medium (medium for recording data) 2, and a magnetic head (not shown) for performing reading of data from the recording medium 2 and writing of data to the recording medium 2.

An upper surface (first outer surface) 1a of a top cover of a base of the storage device 1 is a position for maximum vibration in a direction perpendicular to the surface of the storage device 1. A side surface (second outer surface) 1b of the base of the storage device 1 is a position for maximum vibration in an in-plane direction of the storage device 1, which is adjacent to and orthogonal to the upper surface 1a of the top cover.

The structure for attaching a vibration sensor to the storage device 1 includes a vibration sensor (first vibration sensor) 3, a vibration sensor (second vibration sensor) 4, and a metal spring (urging section) 5.

The vibration sensor 3 is provided on the upper surface 1a of the top cover to detect vibration in the direction perpendicular to the surface of the recording medium 2.

The vibration sensor 4 is provided on the side surface (second outer surface) 1b to detect vibration in the in-plane direction of the recording medium 2.

The metal spring 5 has a folded substantial L-shape. This folded portion is a bent portion 5a of the metal spring 5. One end portion (first end portion) of the substantial L-shape of the metal spring 5 is bonded to an upper surface of the vibration sensor 3 via an adhesive. The other end portion of the substantial L-shape of the metal spring 5 is bonded to an upper surface of the vibration sensor 4 via an adhesive. As a result, the vibration sensors 3 and 4 and the metal spring 5 are mechanically connected.

Damping members 6 and 7 are affixed to at least one position on the periphery of the bent portion 5a of the metal spring 5. The damping members 6 and 7 are formed of a rubber plate or the like having resilience. In FIG. 1, the damping member 6 is affixed to one end portion of the metal spring 5, and the damping member 7 is affixed to the other end portion of the metal spring 5. These damping members 6 and 7 are provided for preventing vibration propagation from the one vibration sensor 3 (4) to the other vibration sensor 4 (3), and reducing vibration of the metal spring 5 itself.

In the structure for attaching a vibration sensor, the vibration sensors 3 and 4 can be pressed down with a uniform and fixed force by adjusting a bend angle θ of the bent portion 5a of the metal spring 5. Consequently, the attachment strength of the vibration sensors 3 and 4 to the storage device 1 becomes constant, and measurement errors associated with disturbances and attachment hardly occur, thereby enabling to perform highly accurate measurement.

Moreover, the vibration sensor 3 that detects vibration in the direction perpendicular to the surface of the recording medium 2 is provided on the upper surface 1a of the top cover of the base, which is the position for maximum vibration in the direction perpendicular to the surface of the storage device 1, and the vibration sensor 4 that detects vibration in the in-plane direction of the recording medium 2 is provided on the side surface 1b of the base, which is the position for maximum vibration in the in-plane direction of the storage device 1. Accordingly, the vibration sensors can be provided independently at the position for maximum vibration in the direction perpendicular to the surface of the recording medium 2 and in the in-plane direction thereof, thereby enabling to obtain high measurement performance.

A case in which the structure for attaching a vibration sensor to a storage device of the present exemplary embodiment is applied to a hard disk drive (HDD), which is a storage device installed in a personal computer or the like will be explained.

The vibration sensors 3 and 4 used for this measurement are respectively a piezoelectric vibration sensor having a length of 10 mm, a width of 5 mm, and a height of 5 mm.

The metal spring 5 is made of phosphor bronze. The bend angle θ of the metal spring 5 at the bent portion 5a is 85 degrees. The length from the bent portion 5a to the vibration sensor 3 is 30 mm, the width is 15 mm, and the thickness is 0.3 mm. The length from the bent portion 5a to the vibration sensor 4 is 30 mm, and the width is 10 mm.

The damping members 6 and 7 are made of a rubber material. The damping members 6 and 7 have a length of 10 mm, a width of 8 mm, and a thickness of 0.3 mm.

Figure 3:
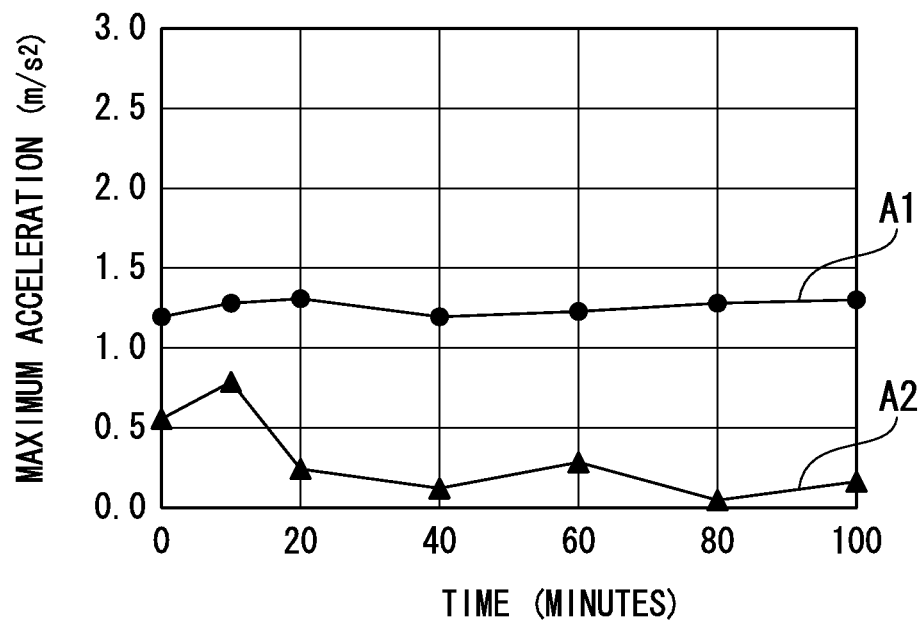
FIG. 3 is a diagram showing temporal change of a maximum acceleration value in a direction perpendicular to the surface of a hard disk drive (HDD).
Figure 4:
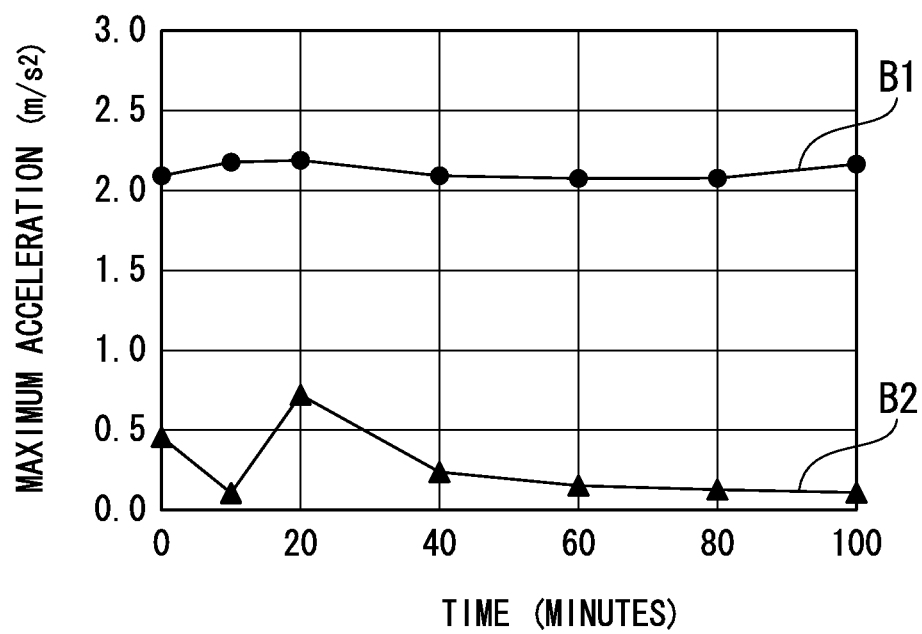
FIG. 4 is a diagram showing temporal change of a maximum acceleration value in an in-plane direction of the hard disk drive (HDD).

FIG. 3 shows temporal changes of a maximum acceleration value when vibration in the direction perpendicular to the surface of the hard disk drive (HDD) is measured by the vibration sensor 3. FIG. 4 shows temporal changes of a maximum acceleration value when vibration in the in-plane direction of the hard disk drive (HDD) is measured by the vibration sensor 4. In this case, the pressing force on each of the vibration sensors 3 and 4 by the metal spring 5 is 0.05 N.

Measurement was performed under a condition with the magnetic head operated at high speed continuously. For comparison, a conventional example in which the damping members 6 and 7 were not affixed but were bonded and fixed by using an adhesive was manufactured, and measurement was similarly performed for the conventional example.

In FIG. 3, curve A1 indicates temporal changes of the maximum acceleration value in one exemplary example of the present exemplary embodiment. Curve A2 indicates temporal changes of the maximum acceleration value in the conventional example. In FIG. 4, curve B1 indicates temporal changes of the maximum acceleration value in the one exemplary example of the present exemplary embodiment. Curve A2 indicates temporal changes of the maximum acceleration value in the conventional example.

According to FIG. 3 and FIG. 4, it is found that in the structure for attaching a vibration sensor of the present exemplary embodiment, measurement values of the acceleration value are large and stable both in the direction perpendicular to the surface of the recording medium 2 and in the in-plane direction thereof, as compared to the structure for attaching a vibration sensor of the conventional example in which bonding and fixation are performed by using an adhesive.

Figures 5, 6:
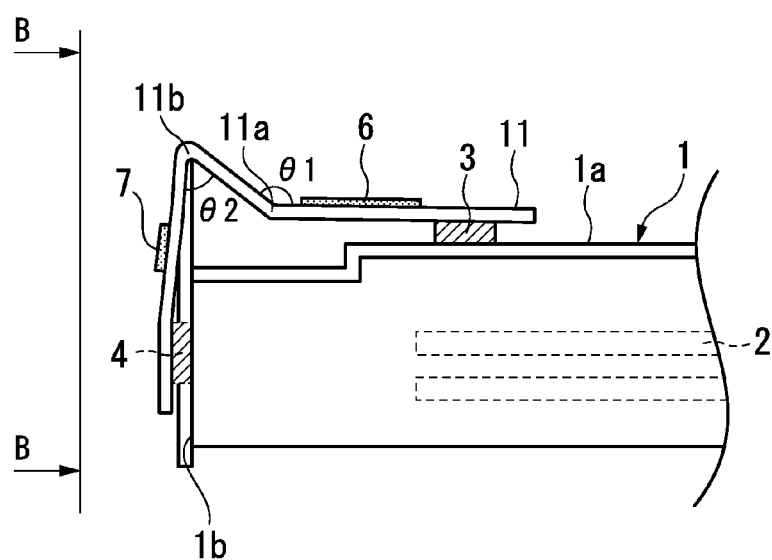
FIG. 5 is a diagram showing acceleration value data at the time of allocating a pressing force of a metal spring to a vibration sensor.
FIG. 6 is a sectional view showing a structure for attaching a vibration sensor to a storage device, according to a second exemplary embodiment of the present invention.

FIG. 5 shows acceleration value data at the time of allocating the pressing force of the metal spring 5 to the vibration sensor 3.

Measurement of acceleration was performed 60 minutes later after the vibration sensor 3 had been attached to the storage device 1 with a pressing force under each condition. Moreover, it was relatively compared, based on acceleration with a pressing force of 0.05 N as a reference.

In FIG. 5, "relative acceleration" means relative acceleration based on acceleration with the pressing force of 0.05 N. "○" indicates that the relative acceleration is a variation within ±20%. "x" indicates that the relative acceleration is a variation lower than −20% or greater than +20%.

According to FIG. 5, it is found that acceleration can be stably measured in a range of the pressing force of from 0.01 N to 0.3 N.

As explained above, according to the structure for attaching a vibration sensor to a storage device of the present exemplary embodiment, the vibration sensors 3 and 4 can be attached to the respective positions for maximum vibration in the direction perpendicular to the surface of the recording medium 2 and in the in-plane direction thereof, and contact of the vibration sensors 3 and 4 with the storage device 1 can be stabilized. As a result, the measurement performance and the measurement accuracy can be improved dramatically.

The shape, attachment position, and material of the vibration sensors 3 and 4, the metal spring 5, and the damping members 6 and 7 of the present exemplary embodiment are not limited to those described above, and can be appropriately changed within the scope of the present invention.

In the present exemplary embodiment, a storage device 1 that performs reading of data from the recording medium 2 and writing of data to the recording medium 2 is explained as an example. However, even if the storage device 1 performs only one of reading of data from the recording medium 2 and writing of data to the recording medium 2, the same effect can be obtained.

In the present exemplary embodiment, the hard disk drive (HDD) is explained as an example of the storage device, however the present invention is not limited thereto. The storage device may be, for example, an optical drive that uses laser beams for reading and writing of data.

Second Exemplary Embodiment

Figure 7:
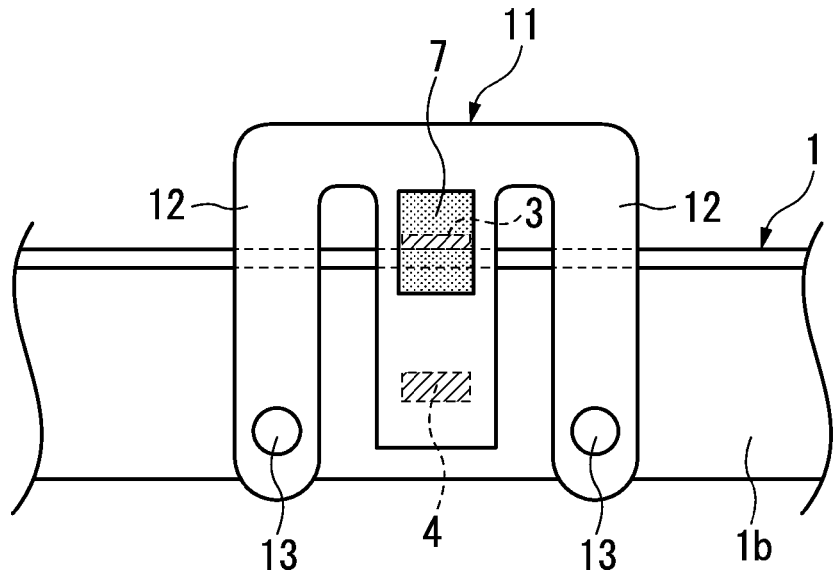
FIG. 7 is a side view as seen from line B-B side in FIG. 6.

FIG. 6 is a sectional view showing a structure for attaching a vibration sensor to a storage device, according to a second exemplary embodiment of the present invention. FIG. 7 is a side view as seen from line B-B side in FIG. 6.

The structure for attaching a vibration sensor to a storage device of the present exemplary embodiment is different from the structure for attaching a vibration sensor to a storage device of the first exemplary embodiment in that the metal spring 5 is replaced by a metal spring 11.

The metal spring (urging section) 11 has a shape folded in two stages. The two sites of these folded portions of the metal spring 11 are bent portions 11a and 11b. One end portion of the substantial L-shape of the metal spring 11 comes in contact with an upper surface of a vibration sensor 3. The other end portion of the substantial L-shape of the metal spring 11 comes in contact with an upper surface of a vibration sensor 4. Substantially L-shaped fixed portions 12, 12 protruding outward are provided on opposite side portions of the metal spring 11. Distal end portions of these fixed portions are fixed to a side surface 1b of the storage device 1 by using fastening components 13, 13 such as screws.

In this structure for attaching a vibration sensor, a pressing force on the vibration sensor 3 can be determined by a bend angle $\theta 1$ of the bent portion 11a, and a pressing force on the vibration sensor 4 can be determined by a bend angle $\theta 2$ of the bent portion 11b.

Also in the structure for attaching a vibration sensor to a storage device of the present exemplary embodiment, as in the structure for attaching a vibration sensor to a storage device of the first exemplary embodiment, the vibration sensors 3 and 4 can be attached to the positions for maximum vibration in a direction perpendicular to the surface of a recording medium 2 and for maximum vibration in the in-plane direction, and contact of the vibration sensors 3 and 4 with the storage device 1 can be stabilized. As a result, the measurement performance and the measurement accuracy can be improved dramatically.

Moreover, because the pressing force on the vibration sensor 3 can be adjusted by the bend angle $\theta 1$ of the bent portion 11a, and the pressing force on the vibration sensor 4 can be adjusted by the bend angle $\theta 2$ of the bent portion 11b, respectively independently, productivity of the structure for attaching a vibration sensor can be improved.

Third Exemplary Embodiment

Figure 8:
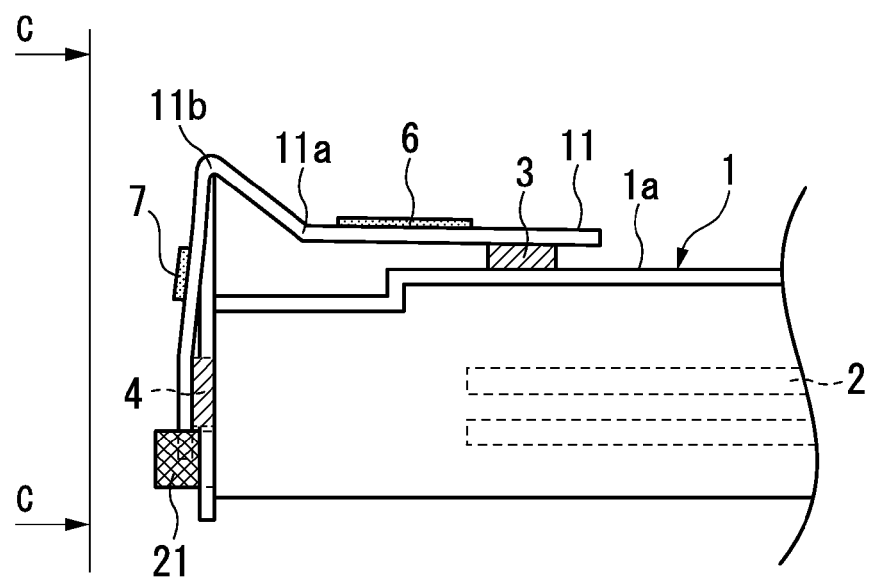
FIG. 8 is a sectional view showing a structure for attaching a vibration sensor to a storage device, according to a third exemplary embodiment of the present invention.
Figure 9:
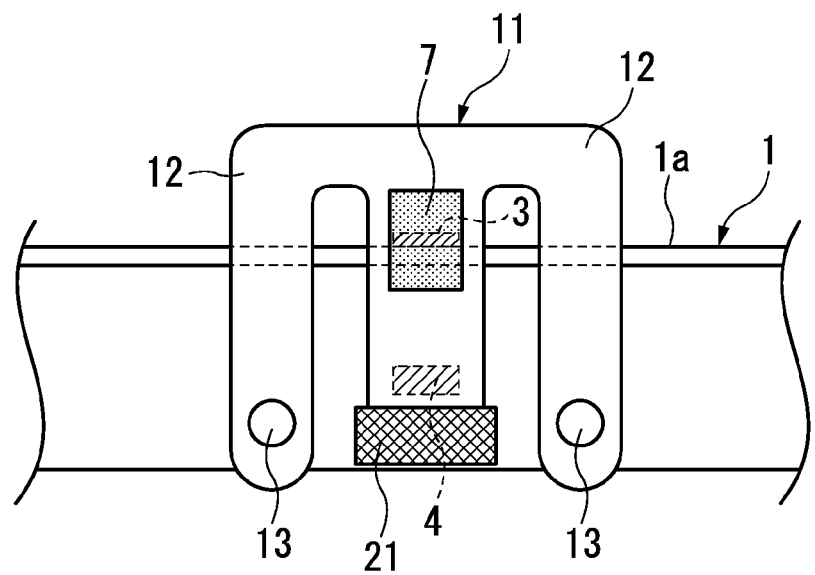
FIG. 9 is a side view as seen from line C-C side in FIG. 8.
Figure 10:
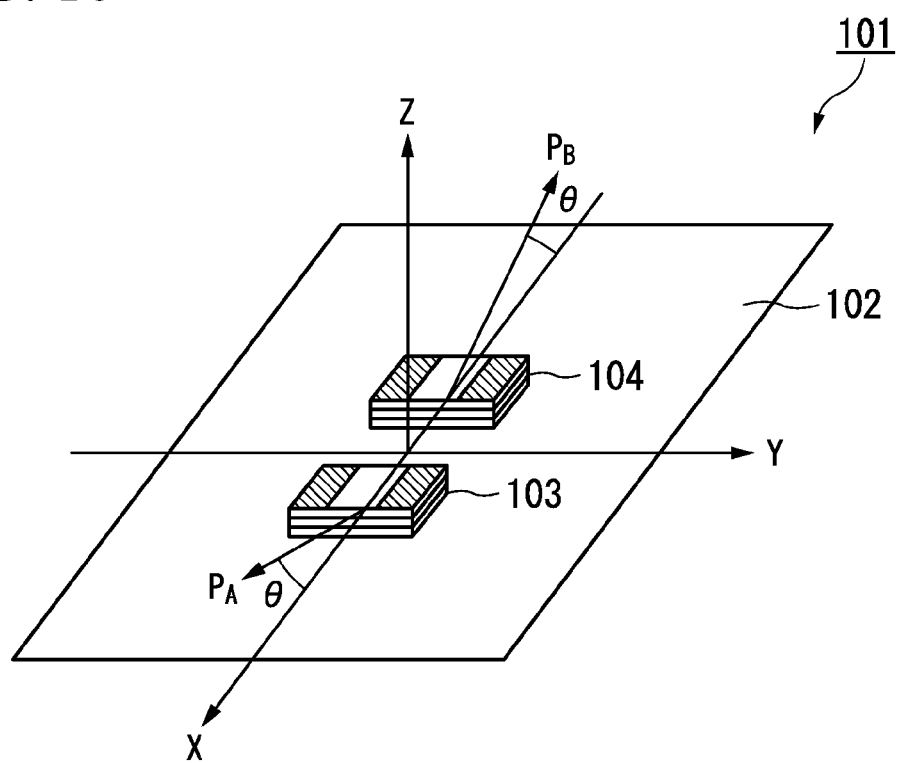
FIG. 10 is a perspective view showing a conventional acceleration detection apparatus.

FIG. 8 is a sectional view showing a structure for attaching a vibration sensor to a storage device, according to a third exemplary embodiment of the present invention. FIG. 9 is a side view as seen from line C-C side in FIG. 8.

The structure for attaching a vibration sensor to a storage device of the present exemplary embodiment is different from the structure for attaching a vibration sensor to a storage device of the second exemplary embodiment in that a protective wall (protective portion) 21 integrally formed with the metal spring 11, is provided at the end portion on the vibration sensor 4 side of the metal spring 11.

Also in the structure for attaching a vibration sensor to a storage device of the present exemplary embodiment, as in the structure for attaching a vibration sensor to a storage device of the second exemplary embodiment, the measurement performance and the measurement accuracy can be improved dramatically.

Moreover, the protective wall 21 integrally formed with the metal spring 11 is provided at the end portion on the vibration sensor 4 side of the metal spring 11. According to this configuration, even if the vibration sensor 4 falls due to extreme impact applied thereto, the fallen vibration sensor 4 can be held by the protective wall 21.

In the present exemplary embodiment, the protective wall 21 is provided at the end portion on the vibration sensor 4 side of the metal spring 11. However, the configuration may be such that the protective wall 21 is provided at a position other than the end portion on the vibration sensor 4 side of the metal spring 11. For example, the protective wall 21 may be provided at the end portion on the vibration sensor 3 side of the metal spring 11.

While the invention has been particularly shown and described with reference to exemplary embodiments thereof, the invention is not limited to these embodiments. Various changes understandable by a person skilled in the art can be made to the configuration and details of the present invention within the scope of the present invention.

This application is based upon and claims the benefit of priority from Japanese patent application No. 2009-194587 filed on Aug. 25, 2009, the disclosure of which is incorporated herein in its entirety by reference.

INDUSTRIAL APPLICABILITY

The present invention is applicable to a structure for attaching a vibration sensor to a storage device. According to the structure for attaching a vibration sensor to a storage device, high detection performance and high detection accuracy can be realized at the time of detecting mechanical vibration of the storage device and vibration and impact applied to the storage device from outside, by the vibration sensor.

DESCRIPTION OF REFERENCE SYMBOLS

1 Storage device
1a Upper surface of a top cover
1b Side surface
2 Recording medium
3 Vibration sensor (first vibration sensor)
4 Vibration sensor (second vibration sensor)
5 Metal spring
5a Bent portion
6, 7 Damping member
11 Metal spring
11a, 11b Bent portion
12 Fixed portion
13 Fastening component
21 Protective wall
$\theta, \theta 1, \theta 2$ Bend angle

The invention claimed is:

1. A structure for attaching a vibration sensor to a storage device having a recording or reproducing head that records on or reproduces from a recording medium, the structure comprising:
    a first vibration sensor which is provided on a first outer surface of a base of the storage device, and detects vibration in a direction perpendicular to a surface of the recording medium;
    a second vibration sensor which is provided on a second outer surface of the base, the second surface orthogonal to the first outer surface, and detects vibration in an in-plane direction of the recording medium;
    an urging section which has a first end portion in contact with an upper surface of the first vibration sensor and a second end portion in contact with an upper surface of the second vibration sensor, and has a substantially L-shape; and
    a damping member which is affixed to the urging section.

2. The structure for attaching a vibration sensor to a storage device according to claim 1, wherein the urging section is fixed to either one or both of the first outer surface and the second outer surface by fastening, welding, or bonding.

3. The structure for attaching a vibration sensor to a storage device according to claim 2, wherein the urging section has two or more bent portions.

4. The structure for attaching a vibration sensor to a storage device according to claim 3, wherein a protective portion integrated with the urging section is provided at the second end portion of the urging section.

5. The structure for attaching a vibration sensor to a storage device according to claim 3, wherein a pressing force applied to the first vibration sensor and the second vibration sensor by the urging section is from 0.01 N to 0.03 N inclusive.

6. The structure for attaching a vibration sensor to a storage device according to claim 2, wherein a protective portion integrated with the urging section is provided at the second end portion of the urging section.

7. The structure for attaching a vibration sensor to a storage device according to claim 6, wherein a pressing force applied to the first vibration sensor and the second vibration sensor by the urging section is from 0.01 N to 0.03 N inclusive.

8. The structure for attaching a vibration sensor to a storage device according to claim 2, wherein a pressing force applied to the first vibration sensor and the second vibration sensor by the urging section is from 0.01 N to 0.03 N inclusive.

9. The structure for attaching a vibration sensor to a storage device according to claim 1, wherein the urging section has two or more bent portions.

10. The structure for attaching a vibration sensor to a storage device according to claim 9, wherein a protective portion integrated with the urging section is provided at the second end portion of the urging section.

11. The structure for attaching a vibration sensor to a storage device according to claim 10, wherein a pressing force applied to the first vibration sensor and the second vibration sensor by the urging section is from 0.01 N to 0.03 N inclusive.

12. The structure for attaching a vibration sensor to a storage device according to claim 9, wherein a pressing force applied to the first vibration sensor and the second vibration sensor by the urging section is from 0.01 N to 0.03 N inclusive.

13. The structure for attaching a vibration sensor to a storage device according to claim 1, wherein a protective portion integrated with the urging section is provided at the second end portion of the urging section.

14. The structure for attaching a vibration sensor to a storage device according to claim 13, wherein a pressing force applied to the first vibration sensor and the second vibration sensor by the urging section is from 0.01 N to 0.03 N inclusive.

15. The structure for attaching a vibration sensor to a storage device according to claim 1, wherein a pressing force applied to the first vibration sensor and the second vibration sensor by the urging section is from 0.01 N to 0.03 N inclusive.

* * * * *